Patented Oct. 21, 1952

2,615,034

UNITED STATES PATENT OFFICE 2,615,034

METHOD OF PREPARATION OF TRIMETHYLCHLOROSILANE

James F. Hyde, Corning, N. Y., assignor to Dow Corning Corporation, Midland, Mich., a corporation of Michigan No Drawing. Application September 21, 1951, Serial No. 247,743

4 Claims. (Cl. 260—448.2)

The subject of this invention relates to a method of preparing trimethylchlorosilane.

The invention is accomplished by treating hexamethyldisiloxane with hydrogen chloride gas in the presence of suitable dehydrating agents at a temperature below 100° C.

In the organosilicon industry, the commercial demand for diorgano substituted silicon products has been high while the demand for the triorgano substituted silicon products has been relatively limited. At the present time, all the major methods of producing organosilanes result in the formation of triorgano compounds. These represent expensive by-products. A. J. Barry et al. disclose and claim, in copending application Serial Number 762,204, a method of converting trimethylchlorosilane to dimethylchlorosilane. This method comprises equilibrating a mixture of trimethyl silicon chloride and monomethyl silicon trichloride or SiCl$_4$ in the presence of AlCl$_3$ to produce dimethyldichlorosilane. However, quite often the trimethyl substituted silicon compound produced during the course of manufacture exists as hexamethyldisiloxane; hence, cannot be used in the foregoing Barry et al. process.

It is the object of this invention to accomplish the conversion of hexamethyldisiloxanes into trimethylsilicon chloride. The trimethylsilicon chloride can then be further processed by equilibration methods to the more valuable dimethyldichlorosilane.

Dehydrating agents operative in this invention are anhydrous chloride salts of the group II metals, having atomic weights less than 140. These are cadmium, zinc, calcium, magnesium, strontium, barium and beryllium. Preferred are the anhydrous chlorides of zinc, calcium or magnesium which are readily available. The dehydrating agent may be used in any amount above .01 mol per mol of disiloxane. Amounts of dehydrating agent in the range of 0.1 to 0.2 mol per mol of disiloxane are preferred. However, the upper limit of the amount of dehydrating agent is not critical.

At least a stoichiometric amount of anhydrous hydrogen chloride is required in the reaction if quantitative yields are to be realized. Excess HCl will not adversely affect the reaction.

Any convenient method may be employed to bring the reactants together. For example, hydrogen chloride may be added to a bomb containing the other materials or hydrogen chloride may be bubbled through the other reactants continuously. It is desirable to prevent undue introduction of moisture to the reaction.

The reaction may be carried out at temperatures below the boiling point of the disiloxane. Preferably, the temperature is in the range of 0 to 25° C. in order to increase the concentration of the HCl dissolved in the system and to lower the volatility of reactants and product.

The following examples are merely illustrative of the invention and are not to be construed as limiting the scope thereof. The invention is properly delineated in the appended claims.

Example 1

3 grams of ZnCl$_2$ was added to 30 gms. (0.2 mol) of [(CH$_3$)$_3$Si]$_2$O in a glass cylinder cooled externally with ice. Dry HCl was then passed into the mixture in a slow steady stream. In a few minutes, turbidity developed and an aqueous layer saturated with ZnCl$_2$ of increasing size appeared. After 5 hours, the reaction appeared complete there being no further increase in the aqueous layer. The non-aqueous layer was then separated and distilled through a 1-foot column. A quantitative yield of (CH$_3$)$_3$SiCl boiling at 58° C. was obtained.

Example 2

Example 1 was repeated using MgCl$_2$ and CaCl$_2$ in place of ZnCl$_2$. In both instances, quantitative yields of (CH$_3$)$_3$SiCl were obtained.

That which is claimed is:

1. A method for preparing trimethylchlorosilane which comprises reacting hydrogen chloride with hexamethyldisiloxane in the presence of at least .01 mol per cent based on the siloxane of an anhydrous chloride of a metal of group II of the periodic table, said metal having an atomic weight less than 140, at a temperature below 100° C.

2. The method of claim 1 wherein the metal chloride is ZnCl$_2$.

3. The method of claim 1 wherein the metal chloride is CaCl$_2$.

4. The method of claim 1 wherein the metal chloride is MgCl$_2$.

JAMES F. HYDE.

REFERENCES CITED

The following references are of record in the file of this patent:

UNITED STATES PATENTS

| Number | Name | Date |
|---|---|---|
| 2,500,761 | Lewis | Mar. 24, 1950 |

OTHER REFERENCES

Flood, Jour. Am. Chem. Soc., vol. 55, page 1735 (1933).

Booth, Chem. Revs., vol. 41, page 97 (1947).

Sommer et al., Jour. Am. Chem. Soc., vol. 70, page 445 (1948).